May 24, 1938.  O. V. CARDINAL  2,118,030
CAR LOADING DEVICE
Filed July 18, 1934
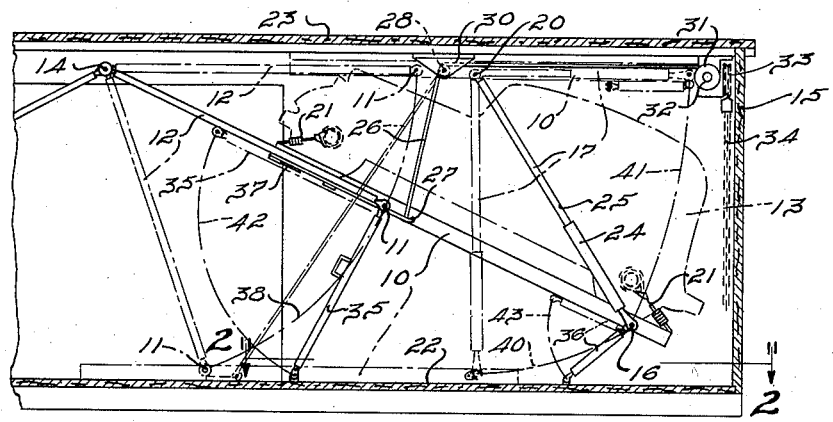
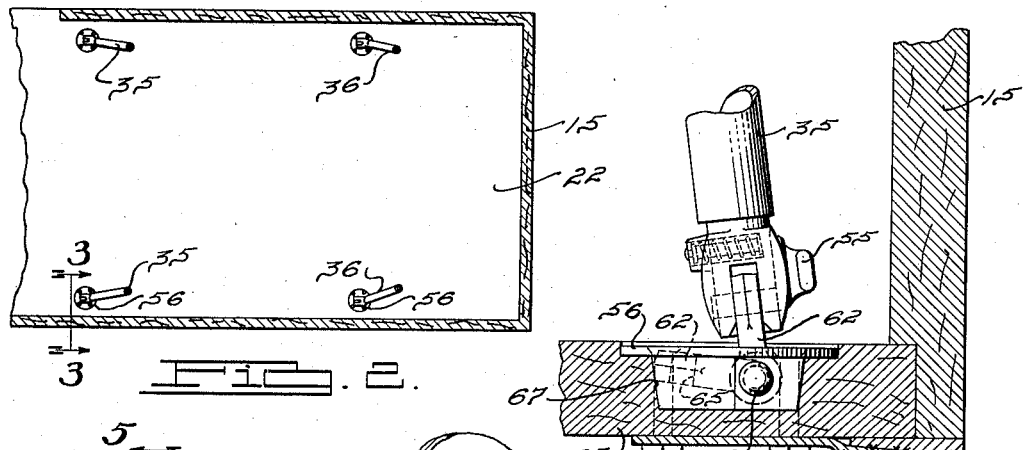
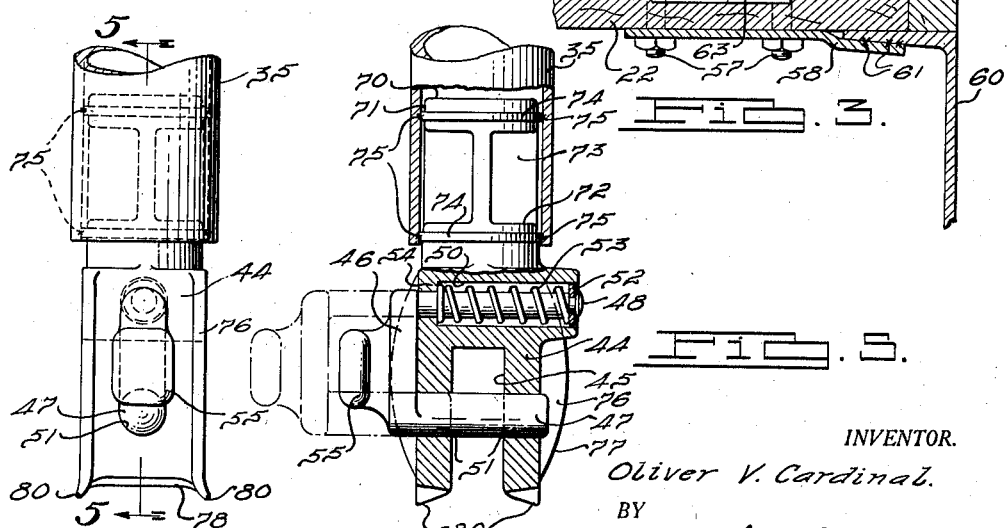
INVENTOR.
Oliver V. Cardinal.
BY
Harness, Dickey, Pierce & Hann.
ATTORNEYS.

Patented May 24, 1938

2,118,030

UNITED STATES PATENT OFFICE 2,118,030

CAR LOADING DEVICE

Oliver V. Cardinal, Detroit, Mich., assignor to The Worth Company, a corporation of Michigan Application July 18, 1934, Serial No. 735,807

3 Claims. (Cl. 248—357)

This invention relates to car loading devices and more especially to mechanism for disposing an automobile in a semi-decking position for transportation purposes.

In certain respects the invention relates to a copending application of Samuel D. Butterworth, for Car loading device, Serial No. 646,830, filed December 12, 1932, and assigned to the same assignee as is the present application.

The principal object of the present invention is to provide mechanism for readily connecting and disconnecting certain parts of a car loading device to and from parts of a freight car.

Another object of the invention is to provide a novel clevis and pin assembly adapted to cooperate with a floor pocket assembly for connecting parts of a car loading device to the floor of a freight car.

A further object is to provide a strong and rigid connecting means for securing a car loading device in a decking position so that an automobile may be safely supported by the device during transportation.

It is also an object of this invention to reduce the time required for loading and unloading automobiles in and from a freight car and for preparing the car for receiving a return load of a different character.

Another object of the invention is to provide a novel clevis and pin assembly having means for preventing accidental lowering of the car frame in the event of breakage or displacement of the clevis pin of such assembly.

Other objects, features and advantages will become apparent from the following description and appended claims.

For the purpose of illustrating the genus of the invention, a typical concrete embodiment is shown in the accompanying drawing, in which:

Fig. 1 is a fragmentary, vertical, longitudinal section of a portion of a freight car and illustrates, more or less diagrammatically, the arrangement therein of a car loading device constructed substantially according to the preferred form of this invention;

Fig. 2 is a horizontal section taken substantially on the line 2—2 of Fig. 1;

Fig. 3 is an enlarged section taken substantially on the line 3—3 of Fig. 2;

Fig. 4 is a side elevation of the clevis and pin assembly shown in Fig. 3, the view being taken from a position adjacent the near side wall of the freight car; and Fig. 5 is a section taken substantially on the line 5—5 of Fig. 4.

Referring to the drawing and more particularly to Figs. 1 and 2 thereof, there is shown a decking frame 10 which is pivotally connected at its forward end, as indicated at 11, to the lower end of a pair of suspension rods 12 disposed on opposite sides of the decking frame with these rods extending upwardly and having their upper ends pivotally connected, as indicated at 14, to metal parts of the frame of a freight car, indicated generally at 15. The rear portion of the frame is pivotally connected at opposite sides, as indicated at 16, to another pair of oppositely disposed suspension rods 17 which have their upper ends pivoted, as indicated at 20, also to metal parts of the car frame. But one of the rods 12 and 17 of each of the pairs of suspension rods are shown in Fig. 1, but it will be understood that similar rods are correspondingly disposed upon opposite sides of the frame 10. The suspension rods 12 and 17 are preferably tubular in form.

A decked automobile, outlined in dot-and-dash lines at 13, may be secured by suitable fastening means 21 to opposite ends of the frame 10. As shown in Fig. 1 in full line, the frame 10 is in semi-decking position, and as shown in dot-and-dash lines, this frame may assume a position adjacent and parallel to the freight car floor 22, or may assume a similar position with respect to the car roof 23. The frame 10 in the position on or adjacent the floor 22 is adapted to have the automobile 13 rolled on or off the frame and when the frame is positioned adjacent the roof 23 it is parallel and close to the roof of the freight car so that the latter may be used for the transportation of a load, such as a return load, of a different character from automobiles. As shown by Fig. 1, the frame 10 is in the floor position when the front pair of suspension rods 12 are inclined forwardly with respect to a vertical plane, and while the rear suspension rods 17 are disposed substantially in a vertical plane.

Each of the suspension rods 17 is of telescopic character and includes a tubular portion 24 which is large enough to receive a smaller upper tubular portion 25 having its inner or lower end enlarged or provided with stop means adapted to engage a shoulder or other stop means at the upper end of the lower tubular member to limit the amount by which the telescopic portion of the parts of the rods 17 may be extended relative to one another. Cables 26 are provided at each side of the frame for elevating the frame and causing the suspension rods 12 and 17 to pivot about their upper pivotal connections 14 and 20 to move the frame 10 longitudinally of the freight car 15 from the floor position to the full line or semi-decking position and to the roof position. The cables 26 are attached to the frame 10 adjacent the pivots 11 upon opposite sides of the frame by brackets, such as indicated at 27. The cables 26 extend upwardly and are trained over pulleys 28 mounted in brackets 30 preferably attached to the metal framing of the roof structure of the freight car 15. The cables then extend substantially parallel to the roof 23 to a point adjacent the end wall of the freight car where they are trained over drums 31 mounted upon a rotary shaft 32. The latter shaft may be operated through a suitable worm wheel and worm gear, or other desired reduction driving means, operable by means of a sprocket wheel upon which a chain 34 is trained. The chain 34 extends downwardly along the end wall of the freight car 15 to a point where it is convenient for manual manipulation to effect the elevation of the frame 10 from its lowered or floor position to the semi-decking and to the roof position. The frame, together with an automobile thereon, due to the gear or other desired reduction driving means interposed between the sprocket wheel 33 and the drum 21 may be raised by manual manipulation of the chain 34 without excessive effort. When the frame 10 is in the floor position, due to the inclination of the forward suspension rod 12 and to the substantially vertical disposition of the suspension rod 17, all of the suspension rods will pivot about their upper pivotal connections 14 and 20 as the frame is elevated from the floor position, and the frame will assume a semi-decking position inclined to the vertical as shown in full lines in Fig. 1. When the frame is in this position and an automobile fastened thereon, it is preferred to use under-supporting members 35 and 36 pivoted to each side of the frame 10 and which may be releasably connected to the metal framing normally provided beneath the floor 22 of the freight car 15 whereby to provide a very rigid mounting for the frame 10 and any load carried thereby during transportation.

To effect the automatic positioning of the decking frame 10 adjacent the roof 23 of the freight car and substantially parallel thereto, outwardly projecting members 37 are provided at the forward end of the frame and on opposite sides thereof adapted to engage the under faces of the suspension rods 12 when the frame reaches semi-decking position or slightly thereafter so that the frame cannot rotate beyond a straight line position about the pivots 11 in a clockwise direction with respect to the suspension rods 12 while the frame is being moved from semi-decking to roof position. The suspension rods 17 will not interfere with this movement from semi-decking to roof position due to the telescopic character of the rods, the rods 17 becoming shorter in effect as the frame is raised from semi-decking to roof position, and in the latter position the rods will lie substantially parallel and along the sides of the frame 10.

When the frame 10 is not loaded with an automobile or the like it may be moved from floor position to roof position by manipulating the chain 34 to tension the cables 26, the lower pivot ends 11 of the suspension rods 12 swinging through arcs indicated at 38 during this operation. The lower pivot ends 16 of the suspension rods 17 move through the arcs 40 and 41 during the elevation of the decking from the floor position to the roof position. When the frame 10 reaches the semi-decking position, or slightly thereafter, the outwardly projecting members 37 engage the undersides of the suspension rods 12 and remain in contact therewith as the frame is elevated to roof position. The under supporting members 35 and 36 are pivotally connected to the lower ends of the suspension rods 12 and 13 and when the lower ends of the under supporting members are disconnected from the car they may be swung through the arcs 42 and 43, respectively, to position the under supporting members substantially parallel with the frame 10. The under supporting members may be fastened to the frame 10 by any suitable means and remain parallel thereto while the frame is elevated to roof position.

Reference may now be had to Fig. 3 which shows a clevis and pin assembly operatively connected to a floor pocket assembly so as to detachably secure the lower end of one of the under supporting members 35 or 36 to the floor 22 of the car 15, and preferably to the metal framing of the freight car disposed below the floor 22. The clevis and pin assembly, as indicated in Figs. 4 and 5, comprises a clevis forging 44 having the upper end thereof disposed within the lower end of an under supporting member 35 or 36 and secured therein as by welding. The lower ends of the clevises 44 are each bifurcated to provide a slot 45 for the reception of a link or tongue 62 of the floor pocket assembly. A substantially U-shaped clevis pin unit 46 has the legs 47 and 48 thereof disposed within suitable transverse bores 50 and 51 extending through the clevis forging 44. A spring retaining washer 52 is secured to the outer end of the leg 48 of the clevis pin unit 46 to retain a spring 53 between this washer and a shoulder 54 provided at one end of the bore 51. The leg 47 constitutes the clevis pin proper and extends transversely of the clevis forging 44 and of the slot 45 therein with the clevis pin spaced a substantial distance from the bottom of the slot 45. A grip piece 55 is formed integral with the bar portion of the clevis pin unit 46 for the purpose of aiding in manually drawing the clevis pin unit outwardly of the clevis forging 44 and to the right as viewed in Fig. 3 so as to withdraw the clevis pin 47 to a position so that it no longer traverses the slot 45.

The floor pocket assembly comprises a floor pocket forging 56 secured, as by means of bolts 57 to a securing plate 58 fixed to the metal framing of the car 15. The side sills 60 of the frame of freight car 15 afford convenient portions of the metal framing of the freight car to which the securing plates may be welded as indicated at 61. The link forging 62 may be pivotally connected to the floor pocket forging 56 by means of a pin 63 so that the link or tongue 62 may fold within a recess in forging 56 as indicated in broken lines in Fig. 3, and in this position does not materially alter the surface of the floor 22. The link or tongue 62 may be swung to a position indicated in full line in Fig. 3 so that the clevis pin leg 47 may engage an opening 65 within the link or tongue to detachably connect an under supporting member 35 or 36 to the floor of the car 15. The cables 26 may be tensioned to assume the weight of the decking frame and any load carried thereby when the members 35 and 36 are to be connected or disconnected from the car to prevent binding between the pin 47 and the link 62. The floor pocket forging 56 may be disposed within a suitable recess 67 cut in the flooring 22 so that the upper surface of the floor pocket forging 56 will be disposed substantially flush or preferably slightly below the upper surface of the flooring 22. The bolts 57 are preferably in the form of flat headed machine screws adapted to be disposed in suitable countersunk recesses so that they will lie substantially flush with the upper surface of the floor pocket forging 56.

Reference may now be had to Figs. 4 and 5 which show more in detail the construction of the clevis forging 44 and clevis pin unit 46. The upper portion of the clevis forging 44 is provided with a portion 70 adapted to be secured within the lower end of an under supporting member 35 or 36 which securing portion comprises spaced cylindrical members 71 and 72 between which is interposed an X-sectioned or cruciform sectioned portion 73 integral with said cylindrical portions. A pair of annular ribs 74 are provided upon the periphery of the cylindrical portions 71 and 72 and these annular rib portions are adapted to be welded to the tubular members 35 or 36 as indicated at 75. The clevis portions of the forgings 44 are preferably reinforced by marginal flanges 76 provided with arcuate peripheries 77 as indicated in Fig. 5. The bottom face 78 of the clevis portion of forging 44 is provided with sharpened dogs 80 which may be turned outwardly slightly as indicated in Fig. 4. These dogs are provided to prevent slippage of the lower ends of the under support members in the event that the clevis pins 47 become broken or disconnected from the links 62 by biting into the wood flooring 22 and thus preventing an undesired dropping of the frame from the semi-decking to the floor position.

As many changes could be made in the above construction and many apparently widely different embodiments of this invention could be had without departing from the scope thereof, it is intended that all matter contained in the above description or shown in the accompanying drawing shall be interpreted as illustrative and not in a limiting sense.

What is claimed is:

1. As an article of manufacture, a clevis and pin assembly comprising a clevis body having a bifurcated portion providing an outwardly opening slot between the branches thereof, said branches being provided with aligned openings extending transversely of the clevis body and spaced from the bottom of said slot, a clevis pin disposed in said openings and adapted to traverse said slot, resilient means for biasingly maintaining said pin in such position that it traverses said slot, and dog means projecting outwardly from the lower end of said clevis body.

2. As an article of manufacture, a clevis and pin assembly comprising a clevis body having a bifurcated portion providing an outwardly opening slot between the branches thereof, said branches being provided with aligned openings extending transversely of the clevis body and spaced from the bottom of said slot, a clevis pin disposed in said opening and adapted to traverse said slot, segment-shaped reinforcement flanges extending along the lengths of the marginal edges of the clevis body in the general direction of the clevis pin and terminating in dog means projecting outwardly from the lower end of the clevis body and adapted to bite into the floor of the freight car to prevent accidental dropping of the decking frame, and resilient means for biasingly maintaining said pin in such position that it traverses said slot.

3. As an article of manufacture, a clevis and pin assembly for detachably connecting a tubular support member of a vehicle decking frame to the floor of a freight car, said assembly comprising a clevis body including at one end a bifurcated portion providing an outwardly opening slot between the branches thereof, said branches being provided with aligned openings extending transversely of the clevis body and spaced from the bottom of said slot, a clevis pin disposed in said openings and adapted to traverse said slot, resilient means for biasingly maintaining such pin in such position that it traverses said slot, and dog means projecting outwardly from the lower end of said clevis body and adapted to bite into the floor of the freight car to prevent accidental dropping of the decking frame, and said clevis body including at its other end a portion adapted to be received within and secured to said tubular member.

OLIVER V. CARDINAL.